(12) United States Patent
Masunaga

(10) Patent No.: US 6,293,671 B1
(45) Date of Patent: Sep. 25, 2001

(54) METHOD FOR WORKING AN AUXILIARY SPECTACLE LENS

(75) Inventor: Satoru Masunaga, Fukui (JP)

(73) Assignee: Masunaga Optical Mfg. Co., Ltd., Fukui (JP)

( * ) Notice: Subject to any disclaimer, the term of this patent is extended or adjusted under 35 U.S.C. 154(b) by 0 days.

(21) Appl. No.: 09/485,867

(22) PCT Filed: Nov. 15, 1999

(86) PCT No.: PCT/JP99/06350

§ 371 Date: Feb. 18, 2000

§ 102(e) Date: Feb. 18, 2000

(87) PCT Pub. No.: WO00/29899

PCT Pub. Date: May 25, 2000

(30) Foreign Application Priority Data

Nov. 17, 1998 (JP) ................................... 10-326570
Nov. 8, 1999 (JP) ................................... 11-316635

(51) Int. Cl.[7] ........................................................ G02C 9/00
(52) U.S. Cl. ............................................. 351/47; 351/41
(58) Field of Search .................................... 351/47, 48, 57, 351/58, 41, 44

(56) References Cited

U.S. PATENT DOCUMENTS 5,975,691 * 11/1999 Ku ........................................... 351/47

* cited by examiner

*Primary Examiner*—Hung Xuan Dang
(74) *Attorney, Agent, or Firm*—Snider & Associates; Ronald R. Snider

(57) ABSTRACT

This invention relates to a method for working an auxiliary spectacle lens to be added to the spectacles in use, in more details, pertaining to a technique for efficiently working such lens that is light in weight and easy to be stably mounted in front of the lenses of the spectacles in use. That is to say, this method comprises the steps of opening a slit of a size on a fringe portion of an unworked auxiliary lens made of synthetic resin by means of a shearing tool and tightly mounting a joint piece with a pigeon-eyed hole opened therein or that provided with bent portions to be suspended onto the lenses of the spectacles in use into said slit. Accordingly, this invention enables even an optical shop of a small scale to deal with such working just by obtaining an unworked auxiliary lens made of synthetic resin, a joint piece and a shearing tool of a simple structure.

6 Claims, 7 Drawing Sheets

METHOD FOR WORKING AN AUXILIARY SPECTACLE LENS

TECHNICAL FIELD

The present invention relates to a method for working an auxiliary spectacle lens, in more details, pertaining to a technique enabling an auxiliary spectacle lens, which is light in weight and easy to be stably mounted in front of the respective lenses of spectacles in use, to be worked in a highly efficient manner. This method is novel in that it can be easily performed even by an optical shop of a small scale.

BACKGROUND ART

When the spectacle wearers go to the places for some activities or leisures where the sun shines so harsh that they are exposed to strong ultra-violet rays contained therein, or when they work for a long time in front of a display of office automation equipment, they try to prevent hazardous rays from penetrating into their eyes, for examples, by overhanging another pair of light-transmission control spectacles on the spectacles in use which is intended for correction of vision or by suspending a frame with light-transmission control lenses mounted therein with clips on the frontal part of the spectacles frame in use.

However, such overhanging of two spectacle frames bothers the wearers because it increases the weight of the spectacles as a whole. When said frame is suspended on the spectacles in use, its weight tends to be lopsided to the frontal part thereof, so that the spectacles becomes vulnerable to being displaced from its normal position on the face.

In view of such inconveniences as mentioned above, recently, a pair of spectacles for correction of vision has been proposed, on the rims of whose frame certain number of hooks are provided, on which hooks light transmission control lenses are sustained. However, it was not popular among the users because those hooks look unshapely and turn to be dangerous objects when said auxiliary lenses are removed therefrom.

By the way, a pair of rimless spectacles, on the respective lenses of which holes are bored, into which rod members protruding from a bridge and bracket endpieces are inserted so as to hold the lenses in place, has been popular among the recent wearers who favor eyeglasses wide in view, light in weight and with a sophisticated design rather than a pair of spectacles whose lenses are held by the rims surrounding them.

With the above rimless spectacles, said clip-type lens frame can not be directly suspended on its lenses. All the worse, the overhanging of the spectacles with light transmission control lenses mounted thereon ruins the shapely design of rimless spectacles.

Furthermore, recently, a pair of spectacles to improve both far and near vision which enables the wearers to look at a far sight and to carry out chores at hand without changing the glasses has been favorably received by the wearers since a dual focus lens and progressive focus lens with a focus region for far sight and that for near sight integrated therein have been developed. However, in addition to the fact that such lenses are very expensive, because their far and near focus regions are narrow, in either cases where the conventional spectacles of such type is used to look at a far sight and used to do chores at hand, for example, reading, due to narrowness in its effective field of vision, especially in the latter case, it causes strains of the eyes, so that when they do chores at hand for a long time, they could not help wearing a pair of spectacles exclusively used therefor and when they look at a far sight for a long time, driving, for example, they could not help wearing a pair of spectacles exclusively used therefor.

In view of the above-mentioned inconveniences encountered when the wearers want to add other optical functions to the spectacle lenses in use or switch those lenses with other types thereof, the present invention is to provide a new method for efficiently working an auxiliary spectacle lens which is light in weight and is easy to be stably mounted in front of the respective lenses of the spectacles in use.

DISCLOSURE OF THE INVENTION

The means adopted in this invention to solve the above issues is as follows.

That is to say, it is characterized in that an auxiliary spectacle lens is worked by opening slits of a certain size on the fringe portions of an unworked auxiliary lens molded of synthetic resin and inserting joint pieces into those slits, by way of which pieces, this auxiliary spectacle lens is mounted on the respective lenses of the spectacles in use. It enables a function inherent in sunglasses, an infrared rays transmission control means for office automation equipment and a means to improve the wearers' sight for doing chores at hand to be added to the spectacles in use. In order to hold an auxiliary spectacle lens in place against the spectacles in use by means of said joint piece, for examples, said auxiliary lens is mounted onto the spectacles in use by inserting a pigeon-eyed hole opened in said joint piece into a projecting portion of the spectacles in use or by providing a bent portion having a hook member thereon with said joint piece.

Hereinafter, the best mode for carrying out the invention is described with reference to the accompanying drawings.

BRIEF DESCRIPTION OF THE DRAWINGS

FIGS. 1 to 6 are views for explaining the first embodiment of the present invention, of which FIG. 1 is an explanatory view to show an auxiliary lens obtained by the first embodiment thereof mounted onto the U.S.patented invention under the registration No. 5,585,870 belonging to the applicant titled "a rimless spectacles with its lenses supported and clipped at three points"; FIG. 2 is a perspective view to show slits opened on the fringe portions of said auxiliary lens; FIG. 3 is a partly enlarged perspective view to show a joint piece with a pigeon-eyed hole thereon mounted onto said slit; FIG. 4 is a partly enlarged perspective view to show a joint piece with an extended arm and magnet provided thereon mounted onto said auxiliary lens; FIG. 5 is a partly enlarged side view to show said auxiliary lens mounted to the spectacles by attaching said magnet onto the proximal end portion of the temple; FIG. 6 is a partly enlarged side view seen from the proximal end portion of the temple to show the state where said auxiliary lens mounted to the spectacles; FIGS. 7 to 9 are views to be used for explaining the second embodiment of the present invention, of which FIG. 7 is a broken perspective view to show said joint pieces inserted into the slits and hook members inserted into said joint pieces, said members being covered with sleeves; FIG. 8 is a sectional view of said joint piece to show how the hook member is inserted into the former; FIG. 9 is a broken perspective view to show the state where an auxiliary lens obtained by the second embodiment mounted to an ordinary spectacles whose lenses are enclosed with the rims.

Figure 1:
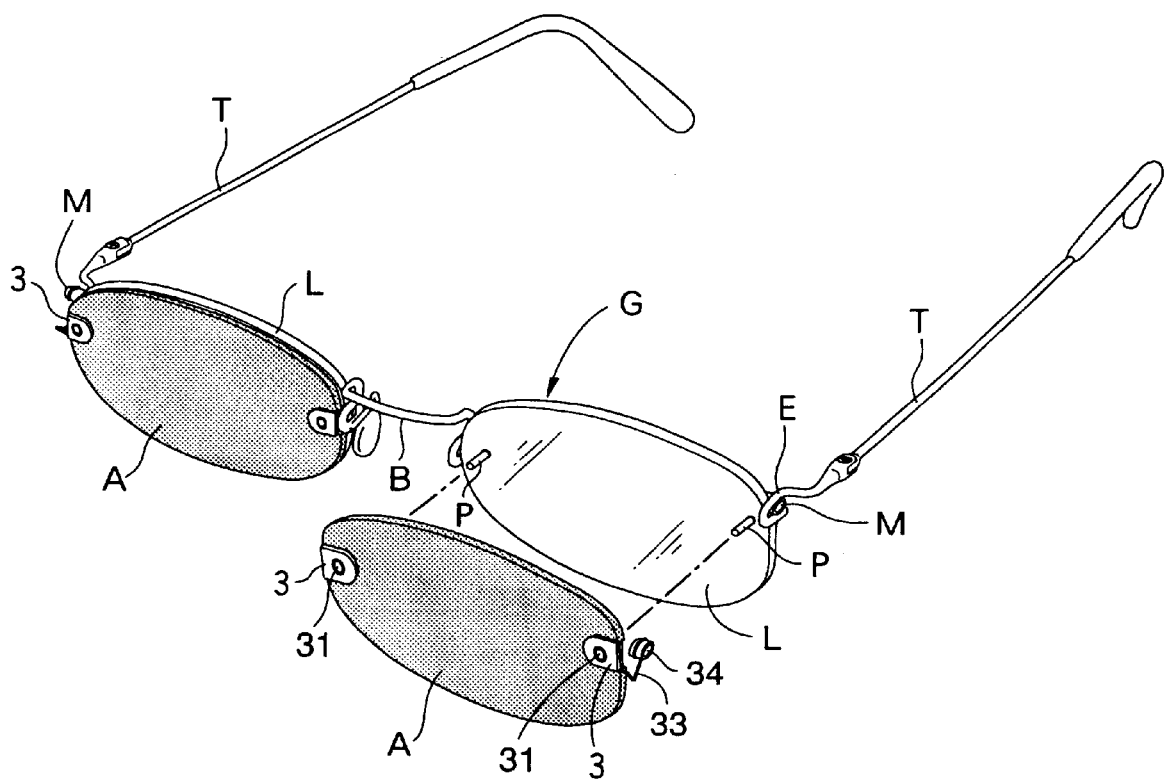

BEST MODE FOR CARRYING OUT THE INVENTION
(FIRST EMBODIMENT)

Reference number (1) in the drawings indicates an unworked auxiliary lens molded of acrylic resin containing light transmission control pigment, which resin in the present embodiment contains a well-known ultra-violet rays absorbing compound.

Figure 2:
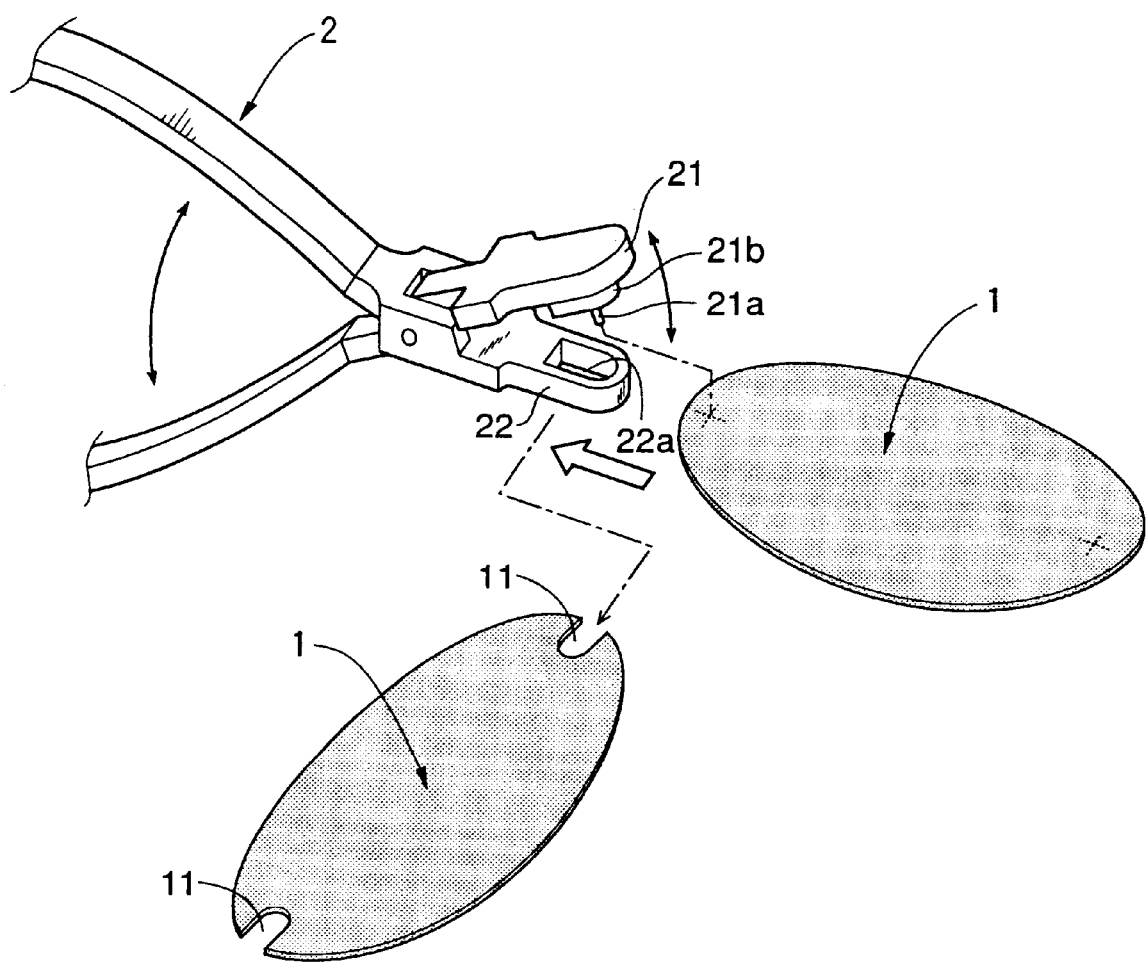

Reference number (2) in FIG. 2 indicates a shearing tool of pliers type. A cylindrical pin (21a) to abut a target portion of said unworked auxiliary lens to be punched through, which target portion being indicated with a cross mark in FIG. 2, and a horseshoe shaped punching tooth (21b) are provided on the inner surface of an upper jaw (21) thereof. On a lower jaw (22) to be engaged with said upper jaw, a shearing aperture (22a) is provided in response to said tooth (21b).

On the right and left fringe portions of the unworked auxiliary lens, by positioning a target portion thereof to be cut with said pin and punching the same, slits (11) are provided.

Figure 3:
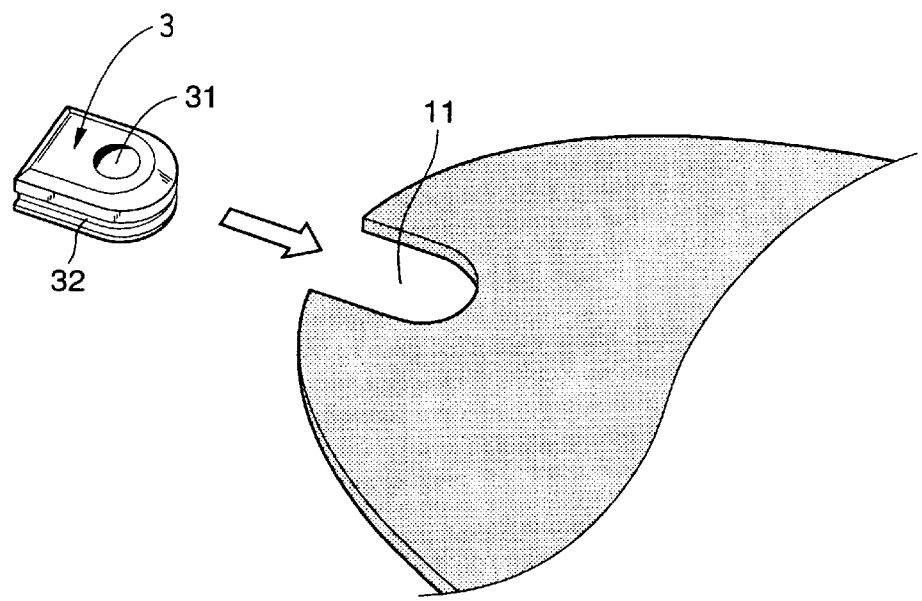

Then, into one of the slits, a joint piece (3) of horseshoe shape with a pigeon-eyed hole provided therethrough as shown in FIG. 3 is inserted, which joint piece is integrally made of hard synthetic resin (acrylic resin) by injection molding. At the tip end portion of said joint piece, a pigeon-eyed hole (31) is provided and on the whole circumference of both fringe sides thereof sandwiching said tip end portion, a groove (32) of a size to adapt the thickness of said auxiliary lens is provided. Therefore, by inserting said joint piece through its groove into the slit, the former can be just fitted into the latter.

Figure 4:
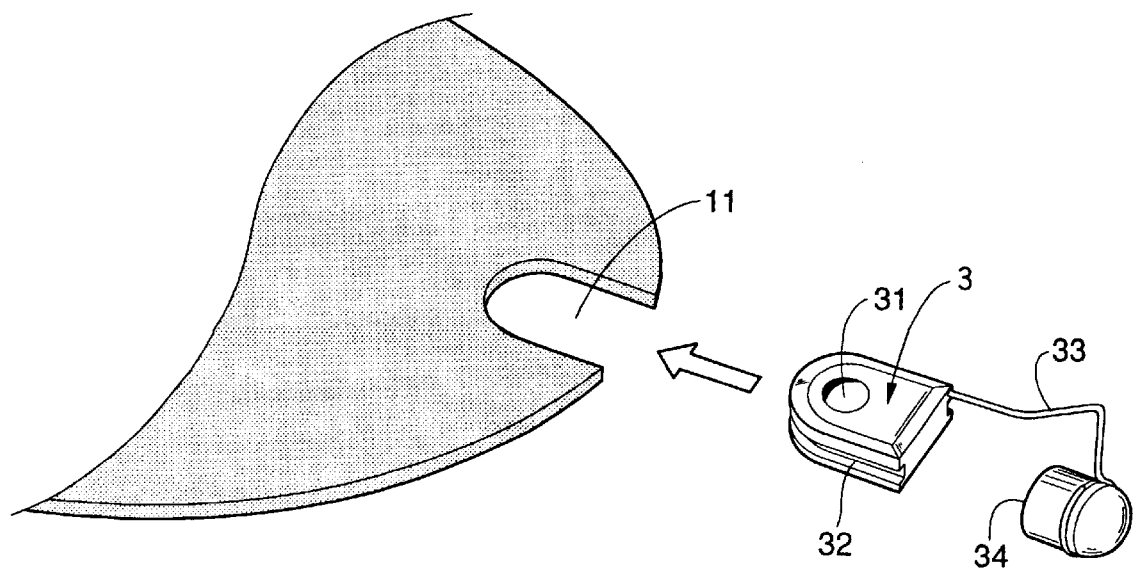

Into the other slit, a joint piece with a pigeon-eyed hole provided therethrough as shown in FIG. 4 is inserted, thereby, the unworked auxiliary lens being arranged in the form of an auxiliary lens (A). In the present embodiment, two types of joint pieces are used as shown in FIGS. 3 and 4. The main body portion of the joint piece as shown in FIG. 4 has the same configuration as that as shown in FIG. 3. The differences therebwteen are in that the latter has an extended arm (33) formed of a wiring material made of a super elastic alloy (based on nickel-titanium), which arm bends and extends rearwards from the edge portion of the rear end of the joint piece, and the protrusive end of said arm (33) is provided with a magnet (34) made from rare earth elements.

Said auxiliary spectacle lens (A) is arranged so that it is mounted to a rimless spectacles described in the specification of the U.S. Pat. No. 5,585,870 belonging to the applicant titled "rimless spectacles with its lenses supported and clipped at three points", the state where those auxiliary lenses (A) are mounted to this type of spectacles being shown in FIG. 1.

Figure 5:
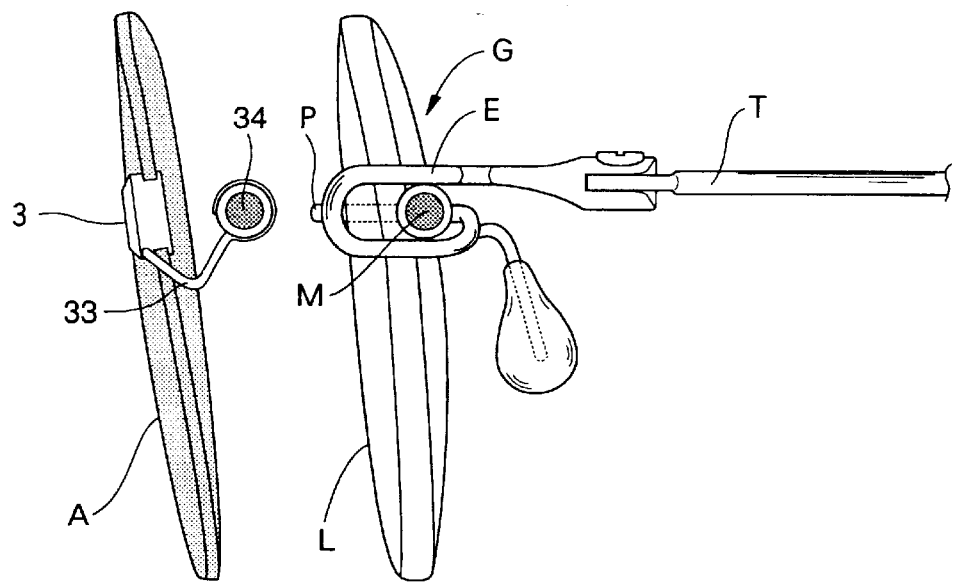

Namely, as shown in FIG. 1, a pin (P) of the bridge (B) projects from the ocular side of the respective lenses (L) of the spectacles (G) towards the frontal surface thereof while a pin (P) of the bracket endpiece (E) extending from the proximal end portion of the temple (T) projects from the ocular side thereof towards the frontal surface thereof. The former pin is inserted into a pigeon-eyed hole (31) of the joint piece without being provided with an extended arm while the latter pin is inserted into that of the joint piece provided with such arm. Then, the magnet (34) provided at the protrusive end of the extended arm is attached to a magnetic metallic portion (M) of the proximal end portion of the temple. FIG. 5 shows this magnet attached onto said metallic portion.

Figure 6:
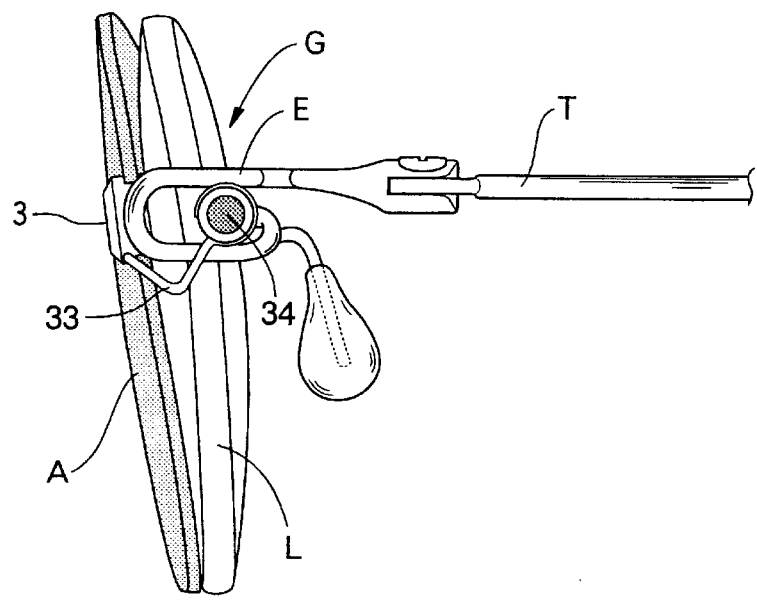

That is to say, the magnet mounted to the distal end portion of said arm (33), as shown in FIG. 5, is attached onto the metallic portion (M) (comprising a magnet of polarity reverse to the magnet of the arm) disposed on the proximal end portion of the temple. In this way, the mounting of those auxiliary lenses to the spectacles becomes very stable, as shown in FIG. 6, so that there is no possibility that they drop even if they are subjected to strong vibration.

(SECOND EMBODIMENT)

Figure 7:
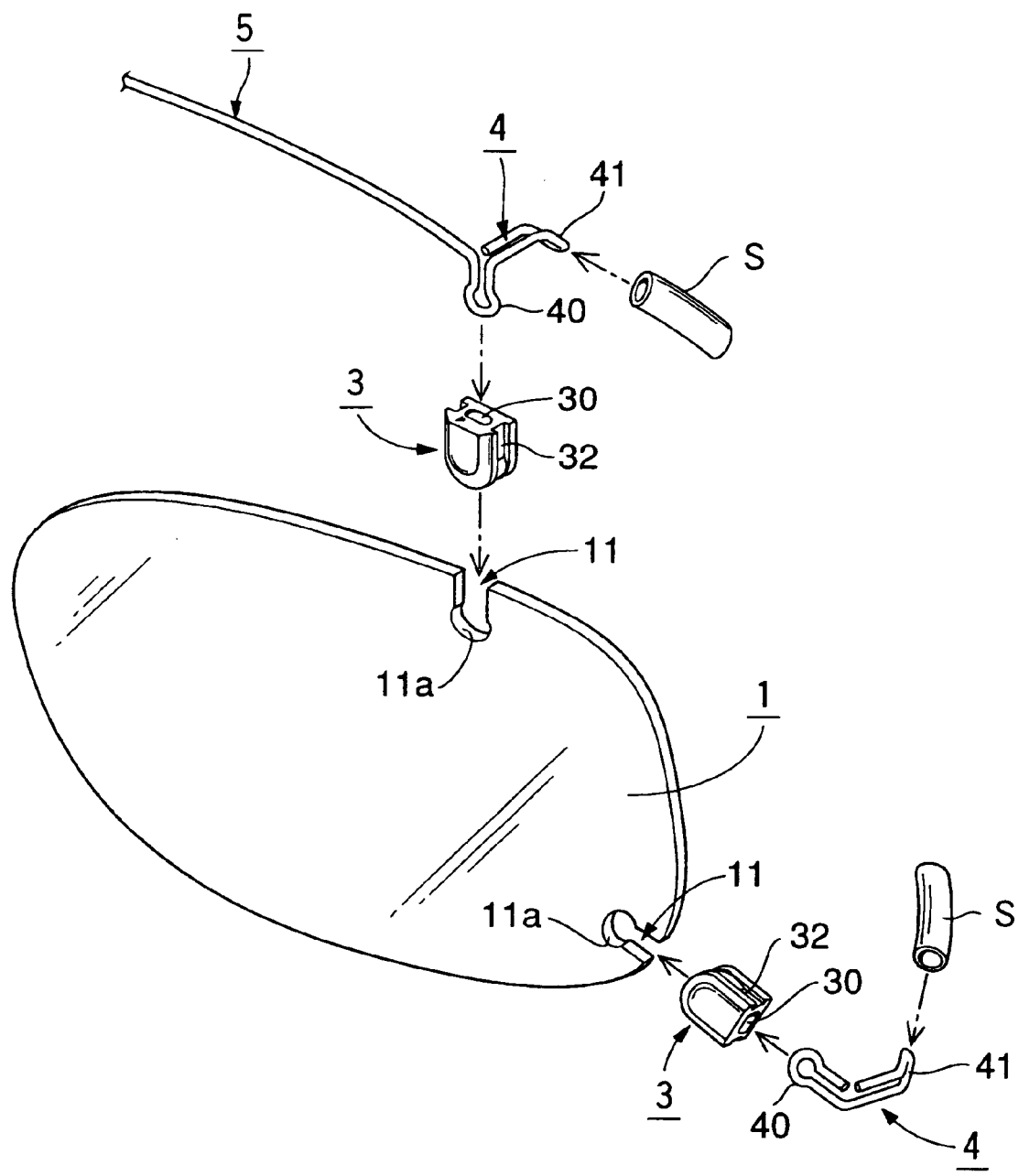
Figure 8:
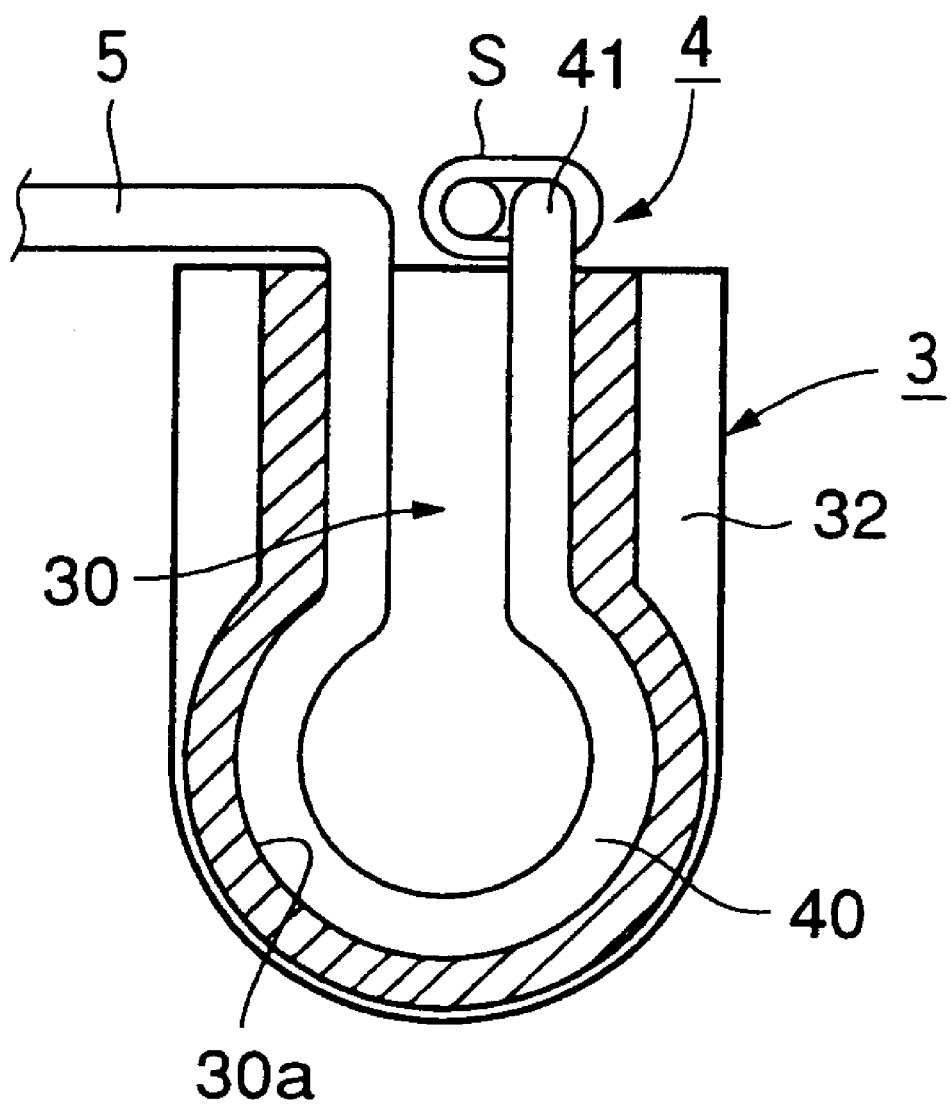
Figure 9:
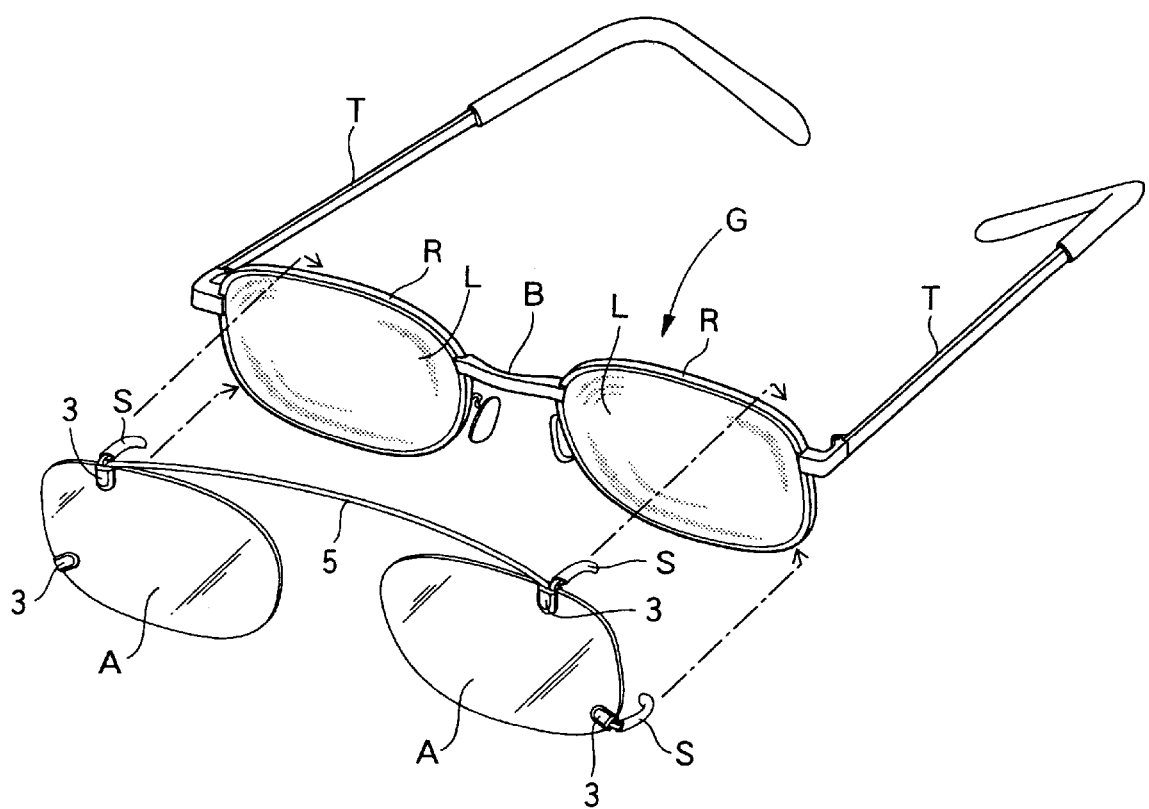

FIGS. 7 to 9 show the second embodiment of this invention. An auxiliary spectacle lens worked by this embodiment is appropriate for being mounted to an ordinary pair of spectacles the lenses of which are held by the rims (R) surrounding them and are intended for improving a far sight of the wearers.

Namely, reference number (1) in FIGS. 7 to 9 indicates a pair of unworked auxiliary lenses to be disposed in front of the frontal surface of the respective lenses of the spectacles in use (G), in this embodiment, a narrow focus lens is adopted for said unworked auxiliary lens in order to add stronger degree of correction to that of the spectacle lenses (L). This facilitates the wearers of advanced ages to do chores at hand. A slit (11) is provided on the upper fringe portion of this auxiliary lens and another slit is provided on the lower portion thereof by means of a shearing tool (2) substantially of the same type as used for the first embodiment. The tool (2) to be used in this embodiment is arranged so that it can form an enlarged portion (11a) at the bottom portion of the slit, which portion is a little wider than the remaining part thereof.

Reference number (3) indicates a joint piece made of synthetic resin which is mountable into the respective slits of said auxiliary lens and in which an opening (30) is formed to receive a projection (41) of a hook member (4) as described below. In this embodiment, a groove (32) to receive the inner circumference of the slit is notched from the tip end portion of the joint piece over the fringe sides thereof, which groove is formed shallow at the tip end portion of the joint piece so as to coincide with the enlarged portion (11a). At the bottom portion of the opening (30), an enlarged portion (30a) is formed as shown in FIG. 8.

Reference number (4) in the drawings indicates a hook member, on the proximal end portion of which a projection (40) to be mounted into said opening (30) is provided and on the distal end portion of which a bent portion (41) to be hooked onto the rims of the spectacles (G) is provided. The hook member of this embodiment is as shown in FIG. 7, the projection and bent portion of which are integrally formed of a string of metallic material by doubling back the same so as to define a hairpin curve. The tip end of the projection (40) is formed in circular shape so that it coincides with the enlarged portion (30a) of said opening (30). To note, the bent portion (41) is covered with a protection sleeve (S).

Reference number (5) in the drawings indicates a bridge member on both sides of which a pair of hook members are connected, by way of which hook members, a pair of auxiliary lenses (1) are symmetrically juxtaposed to each other. The bridge member embodied in the present invention, as shown in FIG. 7, communicates with the end portion of the projection (40) of said hook member, so that those members are integrally formed of a string of metallic wire.

According to the method of this embodiment, the hook members are mounted onto the upper portions of a pair of auxiliary lenses (1) while those lenses (1) are symmetrically juxtaposed with regard to the frontal surface of the spectacle lenses just by mounting a joint piece into the respective slits (11) and then thrusting the projections (40) of said hook members disposed on both ends of the bridge member (4)

into the openings (30) of the joint pieces while the hook members are mounted onto the lower portions of the lenses just by thrusting the projections of the hook members into the openings of said joint pieces tightly mounted into the lower slits so as to elastically deform the same.

The auxiliary spectacle lenses (A) worked in this way are easy to be mounted in front of the lenses (L) of the spectacles (G) in use by suspending the bent portions (41), (41), (41) and (41) respectively covered with a protection sleeve (S) onto the rims (R) and (R) with the bridge member extended to some extent so as to be elastically deformed.

With the auxiliary spectacle lens worked by the method of this embodiment, as the hook members to be hung onto the rims of the spectacles in use are tightly mounted into the joint pieces inserted into the slits, even if external force is applied to the overhung lens, the joint pieces readily absorb such force, so that there is no possibility that such force is directly applied to the auxiliary lenses. Therefore, even if external force should concentrate on such lens, it does not occur that it is easily broken as in the case of the prior equivalents.

Furthermore, in this embodiment, as the projection (40) of the hook member to be mounted into the opening of the joint piece is made of a metallic wire which is bent to define a hairpin curve, it also serves as a shock-absorber so as to readily absorb such force.

When the auxiliary spectacle lens (A) worked by the method of this embodiment is provided with an enlarged portion (11a) at the bottom portion of the slit notched thereon and the tip end portion of the projection of the hook member is formed in circular shape, it makes it possible to secure the hook member onto the auxiliary lens, so that there is no case where the former easily detaches from the latter. Therefore, it is durable enough to be put into practical use.

With the auxiliary spectacle lens according to this embodiment, when the hook members and the bridge member are integrally formed of a string of elastically deformable metallic wire by performing the bending operation thereon, it simplifies its structure so as to make it sophisticated and shapely in design.

Moreover, with the auxiliary lens according to this embodiment, when the respective bent portions of the hook members are covered with a protection sleeve (S), there is no case where those bent portions damage the lenses (L) of the spectacles in use and this sleeve prevents those bent portions from disengaging from the spectacles, so that it enables the auxiliary lens to be mounted thereon in a stable manner.

The concrete examples of the present invention are substantially described above with reference to the accompanying drawings, but it is not limited to the above embodiments, which can be modified in various manners within the scope of the accompanying claims. The following modified examples belong to the technical scope of the present invention.

In the above-mentioned embodiments, an example is shown where a manually operated shearing tool of pliers type is used, but a punching tool may be also adopted, just provided that a slit (11) can be accurately notched on a target portion of an unworked auxiliary lens.

Also, in the first embodiment, an example is shown where a joint piece (3) with a pigeon-eyed hole (31) opened therein is provided with an extended arm and a magnet, which are respectively added to the same as a means to stabilize the auxiliary spectacle lens against the spectacles in use. As a means to restrain a pigeon-eyed hole from disengaging from the pin, this hole may be sustained onto the pin by forming constrictions or lugs on the head portion of the pin so as to be pressed into such constriction. In this respect, this prevention measure may be replaced with the conventional equivalents as known, where appropriate.

INDUSTRIAL APPLICABILITY

As having been described up to here, according to the method embodied in the present invention, as an auxiliary lens which is light in weight and stably mounted in front of the spectacles in use is easily worked in an efficient manner by opening slits on the surface of said lenses and mounting joint pieces into said slits so as to insert a part of said joint piece into a projection protruding from the lens of the spectacles in use or hang the same onto the frontal part of the spectacles in use, even an optical shop of a small scale deals with such working just by means of an inexpensive shearing tool, so that it reduces fixture and equipment cost.

The auxiliary lens worked by the method of this invention is not bulky in shape as in the case of the conventional clip-type auxiliary frame and can be carried in a small lens holder, so that it is very convenient to use.

According to the present invention, even an optical shop of a small scale manages to work an auxiliary spectacle lens which does no damage on the design of the spectacles in use, so that its industrial applicability is very high.

What is claimed is:

1. A method for working an auxiliary spectacle lens comprising the steps of:

opening a slit of a size on a fringe portion of an unworked auxiliary lens made of synthetic resin by means of a shearing tool and mounting a joint piece with a pigeon-eyed hole opened therein into said slit.

2. A method according to claim 1 wherein said joint piece with said pigeon-eyed hole opened therein which is provided with a magnet extended therefrom to a position through an extended arm is mounted into at least either one of the slits opened on both right-and left fringe sides of said unworked auxiliary lens so as to work an auxiliary spectacle lens which is magnetically attached onto a portion of a pair of spectacles in use.

3. A method according to claim 2 wherein said joint piece with said pigeon-eyed hole opened therein to be mounted into said slit being notched on an auxiliary lens is provided with a groove of a thickness to coincide with that of said auxiliary lens at a portion thereof to contact said slit, into which groove said slit is inserted so as to work an auxiliary spectacle lens.

4. A method according to claim 1 wherein said joint piece with said pigeon-eyed hole opened therein to be mounted into said slit being notched on an auxiliary lens is provided with a groove of a thickness to coincide with that of said auxiliary lens at a portion thereof to contact said slit, into which groove said slit is inserted so as to work an auxiliary spectacle lens.

5. A method for working an auxiliary spectacle lens comprising the steps of:

opening a slit of a size on a fringe portion of a pair of unworked auxiliary lenses respectively by means of a shearing tool, said auxiliary lens being made of synthetic resin;

tightly mounting a joint piece provided with a bent portion to be suspended onto the respective lenses of a pair of spectacles in use into said slit so as to work an auxiliary spectacle lens which is mounted in front of the lenses of the spectacles in use.

6. A method according to claim 5 wherein the bent portions of said joint piece to be tightly mounted onto an upper portion of the respective right-and-left auxiliary lenses are integrally formed with a bridge made of an elastic metallic wire.

* * * * *